Dec. 14, 1948. H. V. JAMES 2,456,063
TIRE RETREADING DEVICE
Filed July 24, 1944 3 Sheets-Sheet 1
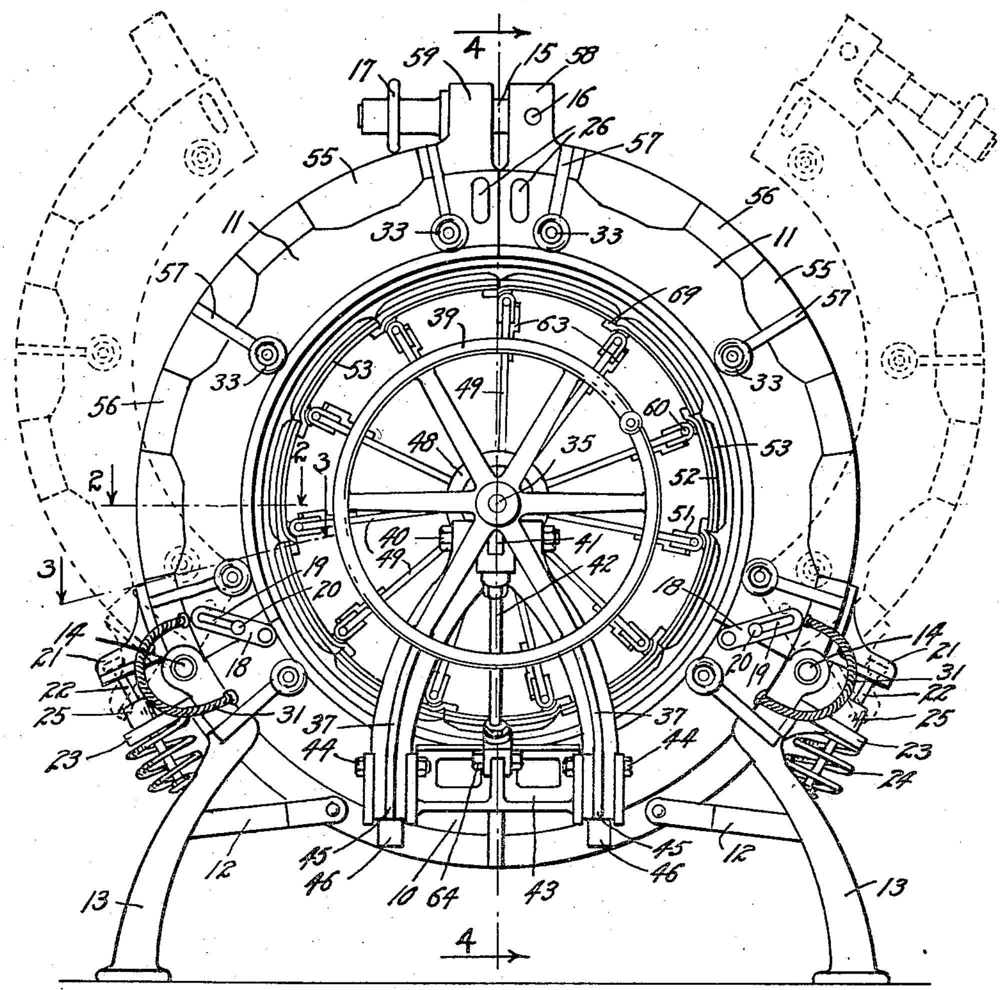
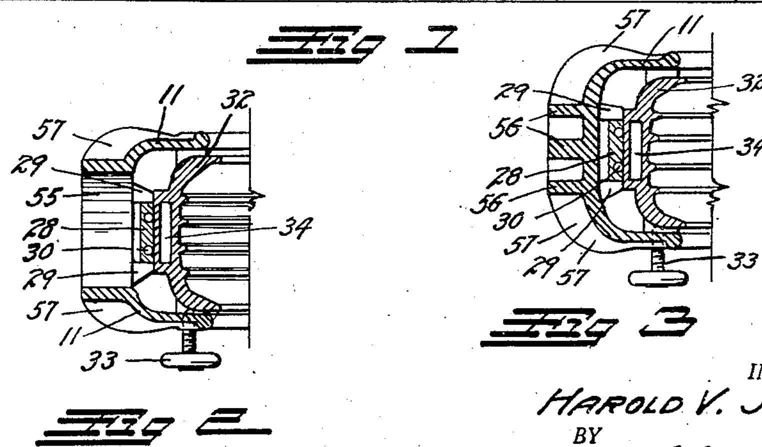
INVENTOR.
HAROLD V. JAMES
BY
ATTORNEY Dec. 14, 1948. H. V. JAMES 2,456,063
TIRE RETREADING DEVICE
Filed July 24, 1944 3 Sheets-Sheet 2
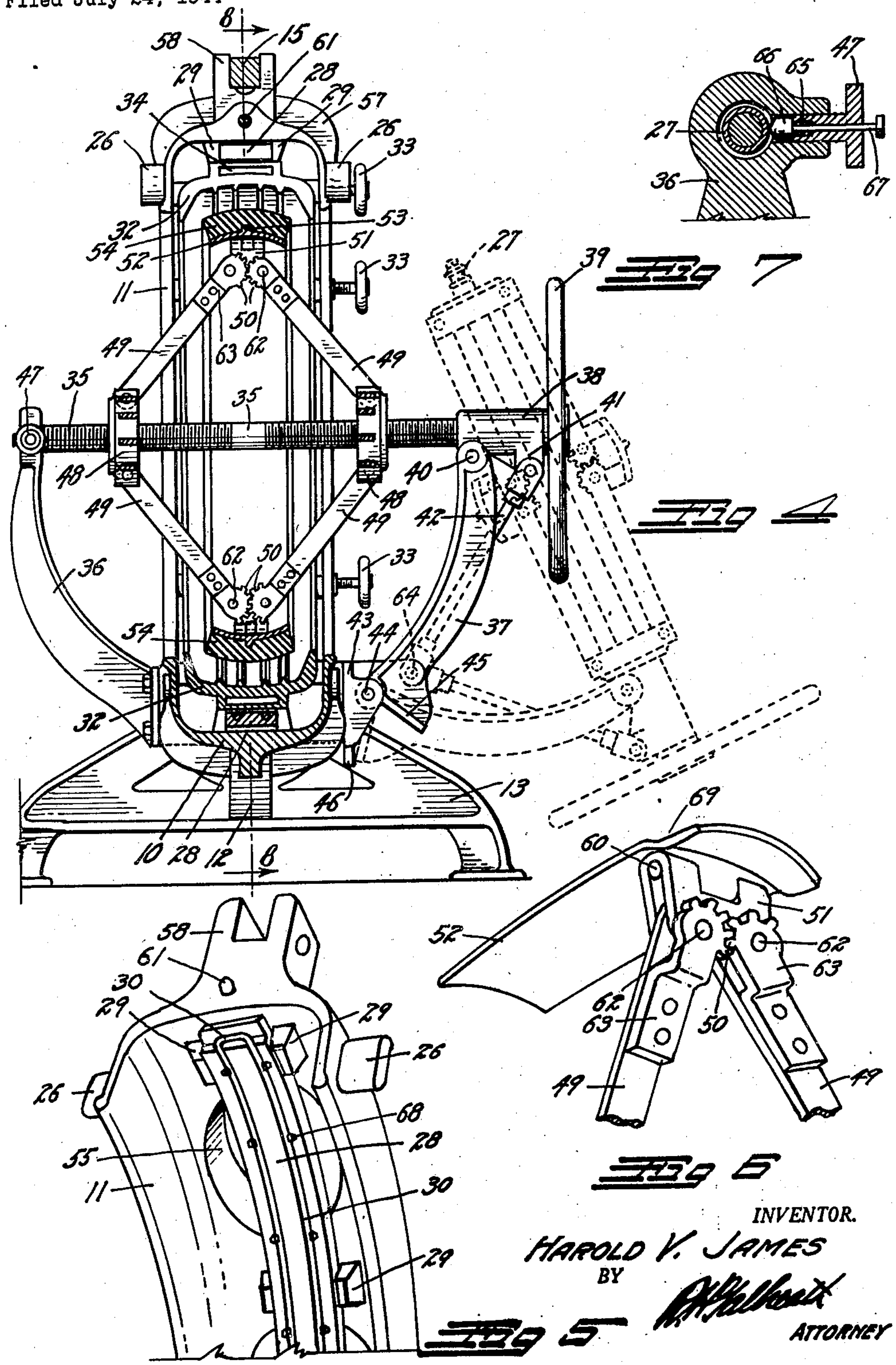
INVENTOR.
HAROLD V. JAMES
BY
ATTORNEY Dec. 14, 1948. H. V. JAMES 2,456,063
TIRE RETREADING DEVICE
Filed July 24, 1944 3 Sheets-Sheet 3
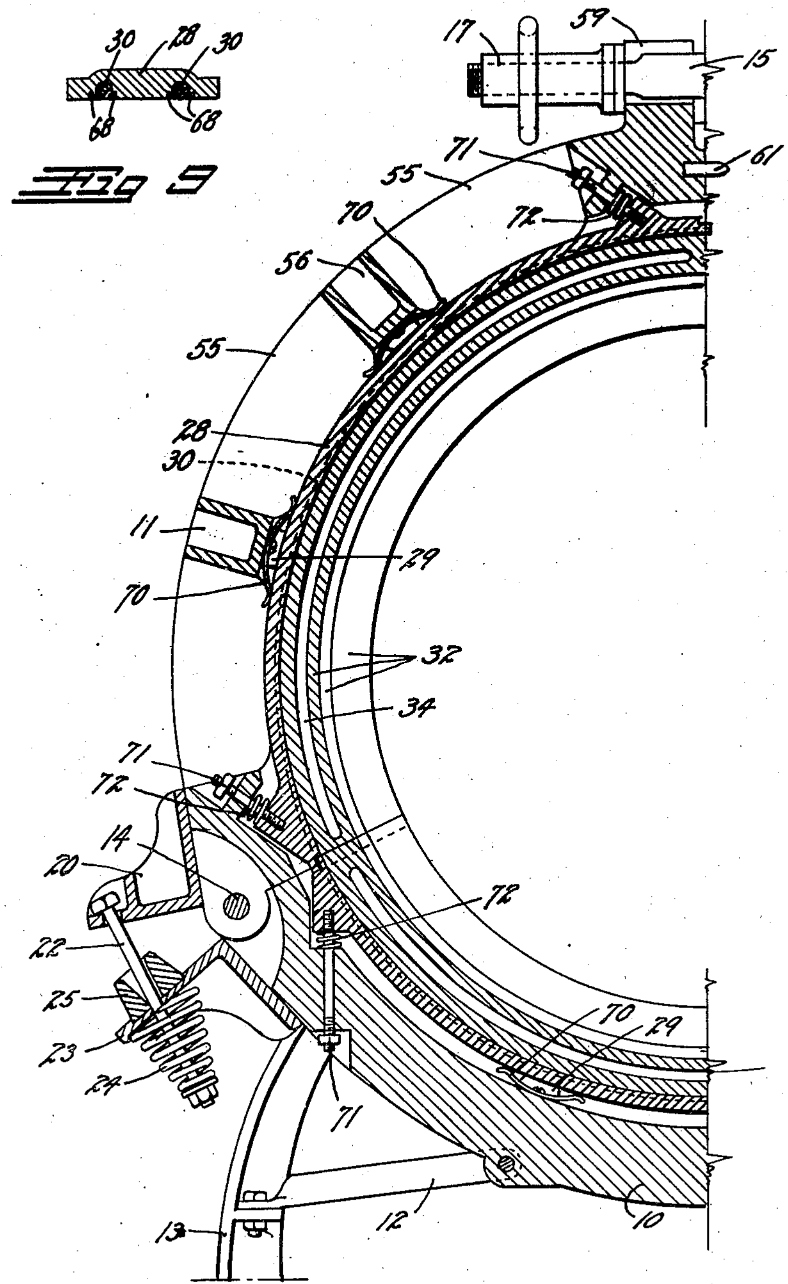
INVENTOR.
HAROLD V. JAMES
BY
ATTORNEY Patented Dec. 14, 1948 2,456,063

UNITED STATES PATENT OFFICE 2,456,063

TIRE RETREADING DEVICE

Harold V. James, Denver, Colo.

Application July 24, 1944, Serial No. 546,266

3 Claims. (Cl. 18—18)

This invention relates to a tire retreading device and has for its principal object the provision of a highly efficient vertical mechanism which will occupy a minimum of floor space and which will apply a uniform mechanical pressure to the tread of the tire, thus eliminating the necessity for all air and steam bags.

The invention is designed more particularly as an improvement over the structure illustrated and described in applicant's prior Patent No. 2,228,316 issued Jan. 4, 1941.

Other objects of the invention are: to provide means for supporting the mechanical pressure device so that it may be easily handled by one man regardless of its weight; to provide a supporting structure for the heating elements which will eliminate all hot spots and obtain a uniform temperature throughout the entire mold area; to provide means for assisting the operator in opening the mold and for cushioning and supporting the latter when in the open position; and to provide means for mounting the mold matrix rings in the mold housing which will eliminate machine operations on the latter and which will be adaptable to receive a wide variety of different sized mold matrix rings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved tire retreading device, illustrating the latter in the closed position, ready for use. In this view the open position of the mold is indicated in broken lines.

Fig. 2 is a cross-section through the mold housing taken on the line 2—2, Fig. 1.

Fig. 3 is a similar cross-section taken on the line 3—3, Fig. 1.

Fig. 4 is a vertical cross-section through the improved retreading device taken on the line 4—4, Fig. 1.

Fig. 5 is a fragmentary perspective view of the interior of the mold housing.

Fig. 6 is detail perspective view illustrating the method of mounting a mechanical pressure shoe on its actuating arms, as used in this device.

Fig. 7 is a detail sectional view through the fixed bracket bearing for the jack screw employed in the improved tire retreading device.

Fig. 8 is a vertical, enlarged, fragmentary section through the mold housing taken on the line 8—8, Fig. 4.

Fig. 9 is a detail cross section through a heating bar employed in the device illustrating the method of securing a heating element therein.

In Fig. 4 only the top and bottom pairs of radial pressure shoe arms have been illustrated. The remainder have been omitted to clarify the illustration.

The improved retreading device is designed to support a tire casing in a vertical position and to apply mechanical expanding pressure to the interior of the tire casing to force it outwardly against an external, heated mold face.

The device comprises a circular, hollow housing formed in three sections, a base section 10 and two hinged sections 11. The base section 10 is supported on suitable supporting legs 13, which are braced by means of suitable leg braces 12.

The hinged sections 11 are mounted on the extremities of the base section 10 upon suitable hinge pins 14 and may be clamped together at their tops to complete the circular mold by means of a threaded clamp bar 15 which is hinged in an upstanding ear 58, on one of the sections 11, on a suitable hinge pin 16. The bar 15 drops into a receiving notch in a similar ear 59 on the other section into which it is clamped by means of a clamping nut 17. By tightening the clamping nut 17, the two sections may be rigidly clamped together.

When the clamp bar is released, the two sections 11 may be swung away from each other about the axis of the hinge pins 14, as shown in broken line in Fig. 1. The amount of outward movement of these sections is limited by means of stop bars 18 which are secured at one of their extremities to the section 10 and are provided with slotted openings 19 for receiving pins 20 fixed to the hinged sections 11. When the pins 20 reach the extremities of the openings 19, outward movement of the sections 11 is stopped.

Each of the sections 11 is provided with a cushioning bracket 21 from each of which a pull bolt 22 is suspended. The pull bolts pass through fixed brackets 23 on the section 10. The pull bolts 22 are constantly pulled downwardly by means of helical compression springs 24. The springs act to cushion the closing action of the two hinged housing sections 11 and to prevent them from falling together with damaging force. A resilient cushion member 25 surrounds each pull bolt. Thus it can be seen that as the sections 11 move inwardly, a portion of their weight will be absorbed by the bolts 22 to allow them to come gently together. When the sections move outwardly, they come to rest on the cushion members 25. The springs 24 also assist the operator in opening the section 11.

A pry boss 26 projects from each of the sections 11 adjacent to the top thereof to allow a pry bar to be inserted therebetween to pry the two sections apart after the retreading operation has been completed.

Each section of the housing is provided with an arcuate heating bar 28 which is resiliently mounted between guide lugs 29 on its inner surface. The heating bars 28 are formed of a metal having a high thermal conductivity, such as aluminum, and each carries an imbedded electrical element 30, such as a "Calrod," from which it derives its heat. The Calrod is inset in a groove in the inner face of the heating bar so as to be exposed to the inner surface thereof. The rods are locked in the grooves by indenting the edges of the latter as shown at 68. The current to the heating elements is conveyed across the hinge points of the adjacent sections through suitable flexible conduits 31.

The actual molding of the tire tread is accomplished by means of a sectional matrix ring 32. The ring 32 is formed in three sections 10 and 11 of the housing. The back of each matrix ring section rests on the lugs 29 in the housing sections fitting the sections and is locked in place therein by means of set screws 33 accessible from the exterior of the housing. The inner face of each matrix ring section provides the mold for the desired tire tread design. The ring sections are quickly and easily removable by simply loosening the set screws 33 so that mold sections of any desired size or design can be quickly and easily placed in the device.

The heating bars 28 are resiliently mounted between the guide lugs 29 upon suitable springs 70 and are each held in place against the action of the springs by means of a pair of retaining bolts 71 extending through the sections 10 and 11. The bolts 71 of each pair are arranged in parallel relation so as to allow free radial movement of the bars 28 without binding. The bolts 71 are so adjusted as to allow the bars to normally project inwardly beyond the tops of the lugs 29, as shown in Fig. 5. Thus when the matrix rings are resting on the tops of the lugs 29 the heating bars will be forced into contact therewith under the influence of the springs 70. The contacting arcuate surfaces of the heating bars 28 and the matrix rings 32 are accurately machined to hold them in uniform contact over their entire areas so that a uniform transference of heat is obtained to the matrix rings 32 throughout the entire circumference of the mold. All contraction and expansion under the influence of heat is accommodated by the springs 70 without affecting the contract between the bars 28 and the matrix rings. The housing sections 10 and 11, are entirely open, through ventilating openings 55, and they do not contact the matrix rings so that free circulation of air is allowed throughout the entire housing so that uniform heating of the matrix results without undue heating of the housing.

Since the only contact between the matrix rings 32 and the housing is at the tops of the lugs 29, it is not necessary to machine the entire inner circumference of the housing. Only the tops of the lugs need to be machined. This reduces manufacturing cost and reduces heat loss to the housing.

The entire tire casing is uniformly forced outwardly against the matrix rings by means of a mechanical pressure device. The latter consists of a jack screw 35 which is detachably supported at its inner extremity in a fixed bracket 36 and at its outer extremity by a hinged bracket 37. A bracket frame 43 is secured to the side of the lower housing section 10. The bracket 37 is hingedly mounted on this frame on suitable hinge bolts 44. At the bracket 37 the jack screw is journalled in a bearing sleeve 38 and terminates in a hand wheel 39. The sleeve 38 is mounted adjacent its inner extremity on a pivot pin 40 in the bracket 37. An ear 41 is formed on the sleeve 38 adjacent its outer extremity for receiving the upper extremity of a connecting rod 42. The lower extremity of the connecting rod 42 is hingedly mounted on a hinge pin 64 on the bracket frame 43 at a point outwardly from and above the axis of the hinge bolts 44.

The above construction operates as follows: As the hand wheel 39 is pulled outwardly, the bracket 37 will swing outwardly. This normally would swing the inner extremity of the jack screw 35 upwardly which would not be possible since it would strike the tire casing in the mold. This is prevented, therefore, by the action of the connecting rod 42 which tends to cause the inner extremity of the jack screw to follow a substantially level path until it leaves the mold and then swings it outwardly to the broken line position of Fig. 4 where it will be out of the way for removing and replacing the tire casings.

Outward movement of the bracket 37 is limited by means of projecting feet 45 formed on the hinged bracket 37. These feet contact abutments 46 on the frame 43 when the bracket 37 reaches its extreme outward position, to support the mechanical pressure mechanism in the out-of-use position.

When the hinged bracket 37 is swung upwardly, the connecting rod also acts on the sleeve 38 to accurately align the jack screw 35 with its bearing position in the inner bracket 36. The jack screw terminates in a spool 27 which slips into the bracket 36 and is locked therein by means of a set screw 47. The spool is rotatably mounted on the jack screw so that the set screw prevents axial withdrawal of the jack screw but allows free rotation thereof.

The jack screw 35 supports a mechanical expanding device which is described more in detail in applicant's prior Patent No. 2,228,316. Briefly, this device comprises two nuts 48 threaded onto opposite extremities of the jack screw 35. The threads on the latter are of opposite hand at the opposite extremities so that rotation of the jack screw in one direction will separate the nuts 48 and rotation in the other direction will cause them to approach each other.

A circular series of pressure shoes 52 surround the jack screw between the nuts 48. Each shoe is hingedly secured to a fitting 51 by means of a hinge pin 60. The extremities of a pair of radial toggle arms 49 are hinged in the fitting on hinge pins 62. A toothed clip 63 is secured to each arm 49. The clips are provided with intermeshing gear teeth 50. The opposite extremity of one toggle arm of each pair is connected to one of the nuts 48 and the other arm is similarly connected to the other nut 48. Thus, when the nuts approach each other, the fittings 51 are forced outwardly, thus expanding the entire series of shoes. When the nuts are separated from each other, the shoes are drawn inwardly toward the jack screw in overlapping relation.

The shoes are curved to approximate the arc of their expanded circumference and each shoe is provided on its outer surface with a central ridge 53 which extends into a medial groove formed in the inner face of a resilient peripheral cushion band 54. The band 54 is formed from resilient compressible and extensible material, such as rubber, and forms the contact member for the interior of the tire casing being retreaded.

Thus it can be seen that when the hand wheel 39 is rotated in one direction, the band 54 will be expanded radially outward to force the tire casing into the matrix rings 32; and when rotated in the other direction, will be contracted away therefrom. The contraction can be extended until the shoes 52 lie close to the jack screw 35, as shown in the broken line in Fig. 4, at which time the band 54 can be entirely removed from the shoes.

It will be noted that one extremity of each of the shoes 52 is inset as shown at 69 to allow them to form a perfect circular alignment in their working diameter.

A dowel pin 61 is positioned in one of the sections 11 so as to enter a dowel hole in the other section to accurately align the two sections when they are clamped together in the closed position. The extremities of the clamp screws 33 are pointed so as to enter countersunk depressions in the matrix rings to accurately locate and lock them in position.

When the device is used for tire casings of smaller diameter, the matrix rings, of course, are of a smaller internal diameter than those illustrated, the difference in size being taken up by increasing the thickness of a contact pad 34 which may be formed on the back of the ring sections. To save metals and weight this pad may be formed hollow as illustrated, if desired.

It is desired to call attention to the bearing construction in the fixed bracket 36 as illustrated in detail in Fig. 7. The stem of the set screw 47 is hollow at the point to receive a detent spring 65. The spring acts against a pointed detent head 66 which forms the extremity of the screw shank. A plunger 67 extends from the head 66 axially outward to project from the screw 47. The point of the detent head enters a peripheral receiving groove in the spool 27 on the extremity of the jack shaft, and when the screw 47 is tightened against the head 66 the latter is locked in place in the groove. If the screw 47 is loosened, however, the head is retained in the groove only by the action of the spring 65, which acts to temporarily hold the jack shaft in place. This construction enables a single operator at the front of the device to withdraw and reinsert the extremity of the jack screw without danger of its falling from place until the screw 47 is tightened.

The hinged sections 11 and the base section 10 are reinforced by means of suitable reinforcing ribs 56 and 57 to prevent distortion from the extreme pressures and temperatures placed thereon.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire retreading device comprising an arcuate, trough-like base section; a similar arcuate trough-like side section hinged to each extremity of the base section, the three sections cooperating when closed to form a complete, annular internal channel; an arcuate heating bar mounted within the trough of each section so as to be radially movable therein; an electric heating element associated with said heating bar to heat the latter; an arcuate tire tread matrix member positioned in each section adjacent said heating bar; springs urging said heating bar against the matrix members; and a pair of retaining bolts extending through each of said trough-like sections from the heating bar therein, the bolts of each pair being parallel to each other and extending completely through said sections to the exterior thereof, said bolts being slidable in the sections and being provided with means on their outer extremities to limit their inward movement.

2. A tire retreading device comprising an arcuate, trough-like base section; a similar arcuate trough-like side section hinged to each extremity of the base section, the three sections cooperating when closed to form a complete, annular internal channel; an arcuate heating bar mounted within the trough of each section so as to be radially movable therein; an electric heating element associated with said heating bar to heat the latter; an arcuate tire tread matrix member positioned in each section adjacent said heating bar; springs urging said heating bar against the matrix members; a pair of retaining bolts extending through each of said trough-like sections from the heating bar therein, the bolts of each pair being parallel to each other and extending completely through said sections to the exterior thereof, said bolts being slidable in the sections and being provided with means on their outer extremities to limit their inward movement; and helical compression springs surrounding said bolts between said heating bars and said sections and acting to urge the former against said matrixes.

3. A pneumatic tire retreading device comprising: an annular hollow housing open at its axial face; an annular heating bar within said housing; means for preventing lateral movement of said bar yet allowing radial movement thereof; an annular matrix ring supported within said housing and within said heating bar; spring means urging said heating bar radially against said matrix ring; and means for guiding the spring-urged movement of said heating bar in a radial direction.

HAROLD V. JAMES.

REFERENCES CITED

The following references are of record in the file of this patent:

UNITED STATES PATENTS

| Number | Name | Date |
|---|---|---|
| 1,745,145 | Brown | Jan. 28, 1930 |
| 1,879,194 | Grange | Sept. 27, 1932 |
| 1,996,971 | Murphy | Apr. 9, 1935 |
| 2,088,130 | Broering et al. | July 27, 1937 |
| 2,219,800 | Allen | Oct. 29, 1940 |
| 2,228,316 | James | Jan. 14, 1941 |
| 2,267,243 | MacMillan | Dec. 23, 1941 |
| 2,338,462 | Seaton | Jan. 4, 1944 |
| 2,345,172 | Bacon | Mar. 28, 1944 |
| 2,370,972 | Kraft | Mar. 6, 1945 |